Jan. 25, 1955 W. P. DONALD 2,700,332

METHOD OF AND APPARATUS FOR HANDLING SLIT COILS

Filed Nov. 30, 1948 3 Sheets-Sheet 1

INVENTOR
William P. Donald
By Hooper, Leonard & Glenn
his attorneys.

Jan. 25, 1955 W. P. DONALD 2,700,332

METHOD OF AND APPARATUS FOR HANDLING SLIT COILS

Filed Nov. 30, 1948 3 Sheets-Sheet 2

INVENTOR
William P. Donald
By Hoopes, Leonard & Glenn,
his attorneys.

METHOD OF AND APPARATUS FOR HANDLING SLIT COILS

Filed Nov. 30, 1948

3 Sheets-Sheet 3

INVENTOR
William P. Donald
By Hopes, Leonard & Glenn,
his attorneys.

United States Patent Office 2,700,332

Patented Jan. 25, 1955

2,700,332

METHOD OF AND APPARATUS FOR HANDLING SLIT COILS

William P. Donald, Cleveland, Ohio, assignor to Wean Equipment Corporation, Euclid, Ohio, a corporation of Ohio Application November 30, 1948, Serial No. 62,604

8 Claims. (Cl. 100—2)

This invention relates to a method of and apparatus for handling slit coils. It has to do with the handling of slit coils from the take-up reel of a coil slitter so as to immediately free the take-up reel for use in a succeeding slitting operation and whereby rapid and efficient handling of the slit coils until they are banded and delivered for storage or shipment in accomplished.

Wide coils, as, for example, coils of steel strip, are slit into narrower coils in well known manner. A wide coil is disposed upon the pay-off reel of a slitter, the material of the coil being paid off and passing continuously through the slitter proper, the slit coils being wound up on a take-up reel. The efficiency of the slitter depends upon the continuity of its use. As soon as the trailing end of the wide coil has left the pay-off reel a new wide coil may be disposed on the pay-off reel for the next slitting operation. However, serious interruption with continuous use of the slitter has heretofore been occasioned by the banding and removal of the slit coils from the slitter take-up reel. Moreover the manner of handling the coils has been inefficient and has required an undesirably great amount of manual work.

I provide a method of and apparatus for handling slit coils obviating the disadvantages above referred to. I provide for immediate removal of the slit coils from the take-up reel as a unit or group so as to free the take-up reel for use in a succeeding slitting operation. This is done prior to banding of the coils. The slit coils may be removed as a group from the take-up reel in a single virtually instantaneous movement so that the take-up reel is freed for use in the subsequent slitting operation almost as soon as the pay-off reel is freed. The result is unprecedented little idle slitter time. Also I handle the slit coils removed from the slitter take-up reel in a rapid and efficient manner so that they are banded and out of the way before the next group of slit coils is ready to be removed from the slitter take-up reel. In accomplishing my improved results I employ a new method and a new combination of apparatus elements which cooperate in a novel manner although many of the apparatus elements which I may employ may be of known construction.

I provide a method of handling slit coils originally disposed in side-by-side coaxial relationship on a slitter take-up reel comprising removing the slit coils as a unit from the slitter take-up reel, thereby immediately freeing the slitter take-up reel for use in a succeeding slitting operation, and thereafter separately banding the slit coils. Preferably I push the slit coils as a unit axially off of the slitter take-up reel onto a receiving mandrel. The receiving mandrel may be part of a swinging arm coil unloader which is a known device. However, its use in the apparatus and according to the method which I propose is to the best of my knowledge and belief novel. The take-up reel and mandrel are arranged in alignment end to end when the group of slit coils is pushed off of the former onto the latter. The swinging arm coil unloader is then operated to disposed the mandrel in position out of alignment with the slitter take-up reel whereupon the slit coils are removed from the mandrel one by one and separately banded and delivered for shipping or storage.

In removing the slit coils one by one from the mandrel I may employ a down-ender which is a known device. The slit coils may be pushed off of the mandrel one by one, each slit coil being taken by the down-ender and laid down in position with its axis extending generally vertically. Each slit coil may be thus laid down on a roller table for delivery to a banding station.

The normal disposition of the slitter swinging arm coil unloader and down-ender is such that the slit coils after being laid down by the down-ender are at or close to floor level. It would be awkward and inefficient to attempt to band the coils when so positioned. I provide for elevating the slit coils one by one to a banding station at convenient height so that workmen may band the coils. Each slit coil laid down by the down-ender may pass to an elevator which raises it to the height of the banding station. The elevator may have a coil receiving table provided with rollers which carry the coil so that when the coil has been elevated to the height of the banding station it may easily be pushed off of the elevator onto a roller conveyor where a workman standing on the floor can apply a band to the coil while it is at a convenient working height. The coil receiving table on the elevator may be tiltably mounted and arranged so that when the coil has been raised to the height of the banding station the table will be tilted to facilitate movement of the coil off of the elevator. This provision is especially desirable when heavy coils are being handled. For relatively light coils it may be dispensed with.

The banding may be done on a roller table, the banded coils being pushed along the roller table to a delivery station where they may either be picked up by a crane or delivered onto a support which may be progressively lowered as it receives successive coils until a stack of coils of the desired height has been formed. The coils may be banded either radially or circumferentially. Ordinarily relatively narrow coils are banded radially and relatively wide coils are banded circumferentially.

Other details, objects and advantages of the invention will become apparent as the following description of certain present preferred embodiments of the invention and certain present preferred methods of practicing the same proceeds.

In accompanying drawings I have shown certain present preferred embodiments of the invention and have illustrated certain present preferred methods of practicing the same, in which Figure 1 is a plan view of the take-up reel of a coil slitter and apparatus for handling slit coils originally disposed on the take-up reel;

Figures 1, 1A, 3:
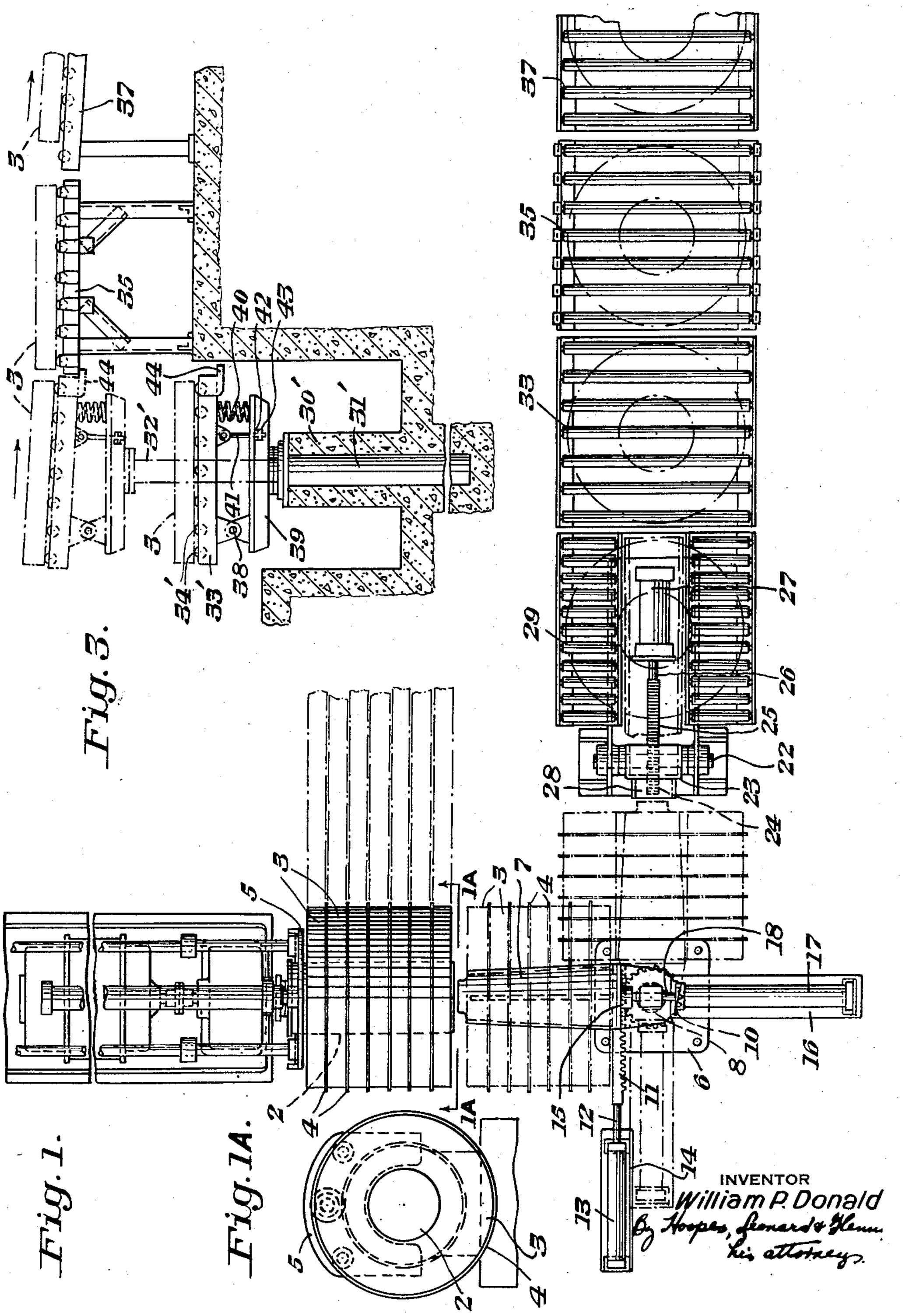
Figure 1A is an end view of a group of slit coils disposed on the slitter take-up reel taken on the line IA—IA in Figure 1.
Figure 3 is a fragmentary elevational view of a modified structure including an elevator having a tiltable coil receiving table.

Referring now more particularly to the drawings, there is shown at 2 in Figure 1 the take-up reel of a strip slitter. The slitter may be of known construction and I claim no invention in the structure of the slitter or take-up reel. The slitter comprises the usual pay-off reel and slitter proper which are not shown in the drawings. The slitter slits a single wide strip into a plurality of narrow strips which are coiled up on the take-up reel 2 in known manner, the take-up reel being appropriately driven to accomplish its function. In the drawings a wide coil is shown as having been slit into seven narrow slit coils 3. The seven coils 3 are shown in Figure 1 as being disposed in side-by-side coaxial relationship on the slitter take-up reel 2. The slit coils 3 are shown as being separated by the usual separator discs 4. A pusher 5 is provided in connection with the take-up reel 2, being operable to push the slit coils off of the take-up reel toward the bottom of the drawing, viewing Figure 1. Since the details of the structure of the pusher do not constitute my invention, they are not shown. The take-up reel and pusher may be of conventional construction.

I also employ a swinging arm coil unloader designated generally by reference numeral 6 and which may itself be of known construction although to the best of my knowledge and belief I utilize it in a novel manner. Since the unloader as an element of apparatus may be of conventional construction it will not be described in detail. It comprises, however, a receiving mandrel 7 which may be aligned with the take-up reel 2 of the slitter as indicated in solid lines in Figure 1 and onto which the slit coils 3 may be pushed as a unit or group by operation of the pusher 5. The mandrel 7 is carried by a post 8 which is mounted in a bearing 9 for turning movement about a vertical axis. The post 8 carries pinion 10 with which meshes a rack 11 carried by a piston rod 12 connected with a piston in a cylinder 13 stationarily mounted at 14. The piston may be operated in the cylinder 13 by any suitable fluid pressure means. Upon movement of the piston from one end of the cylinder to the other the rack 11 turns the pinion 10 and hence the post 8 from a position in which the mandrel 7 is in alignment with the take-up reel 2 to a position in which the mandrel 7 is disposed at an angle to the axis of the take-up reel 2, for example a right angle as indicated in solid lines in Figure 2 and in chain lines in Figure 1.

The swinging arm coil unloader 6 has a pusher 15 for pushing the slit coils off of the mandrel 7. The post 8 carries a bracket 16 which in turn carries a cylinder 17 containing a piston having a piston rod 18 which passes through a bearing 19 carried atop the post 8 and has fastened to it at its outer or right-hand end viewing Figure 2 the pusher 15. As the piston in the cylinder 17 moves toward the right viewing Figure 2 the pusher 15 is moved toward the right to push the slit coils 3 off of the mandrel 7.

Figures 4, 5:
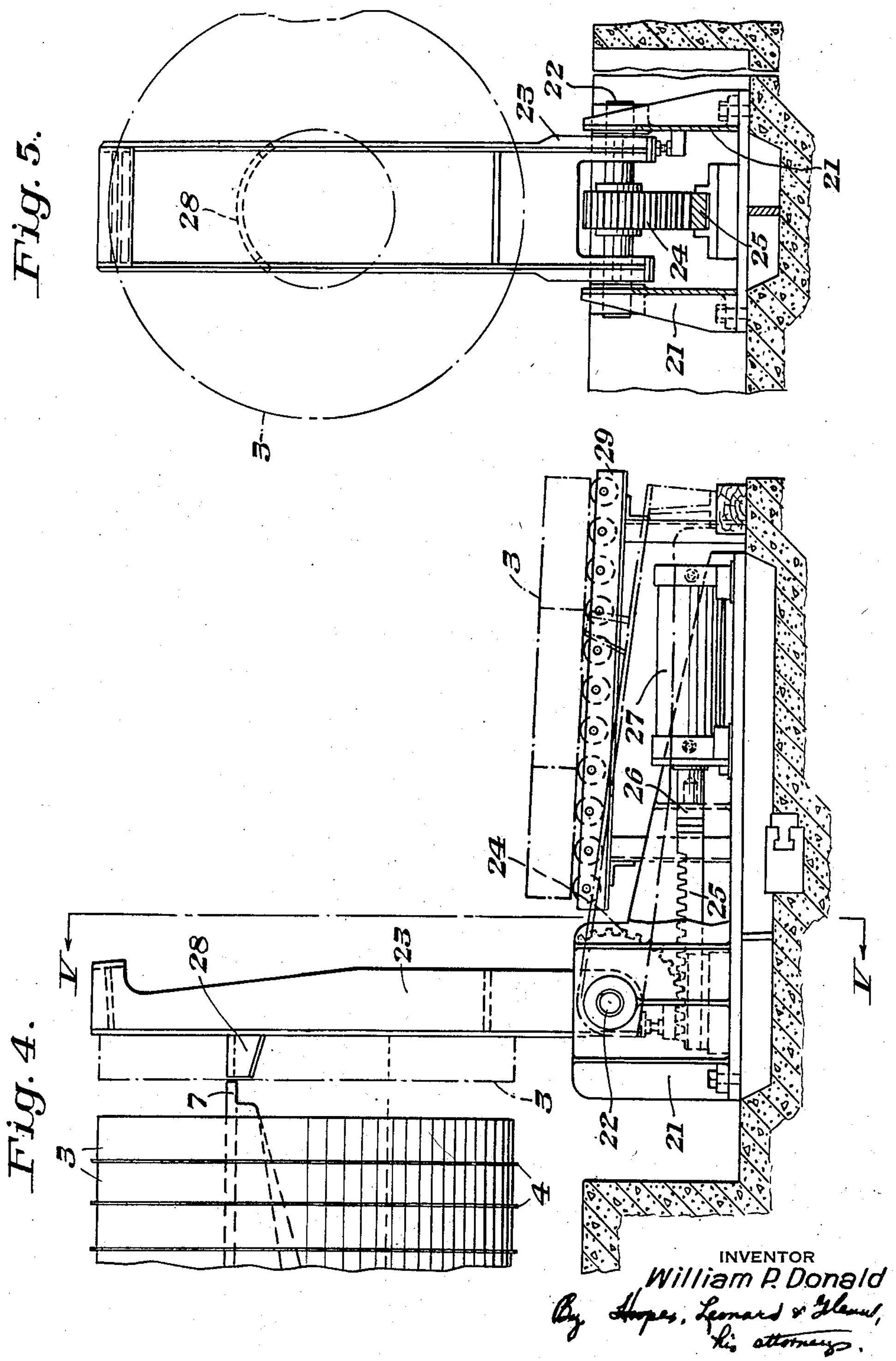
Figure 4 is an enlarged fragmentary elevational view of a portion of the structure shown in Figure 2.
Figure 5 is a vertical cross sectional view taken on the line V—V of Figure 4.

The down-ender is designated generally by reference numeral 20 and may be of conventional construction. It includes opposed bearing members 21 in which is journaled a shaft 22. Keyed to the shaft 22 is a coil receiving arm 23 which is of split construction at its bottom as shown in Figure 5. Keyed to the shaft 22 intermediate the opposed portions of the arm 23 is a pinion segment 24 which meshes with a rack 25 carried by a piston rod 26 which is connected with a piston in a cylinder 27. Movement of the piston in the cylinder 27 causes the rack 25 through the segment 24 to turn the shaft 22 to move the arm 23 between an upright position as shown in solid lines in Figures 2 and 4 and a lowered position as shown in chain lines in those figures. The arm 23 has a coil supporting saddle 28 which when the arm is in upright position as shown in Figure 4 is disposed opposite the mandrel 7 so that one of the slit coils can be pushed off of the end of the mandrel 7 onto the saddle 28.

The down-ender is associated with a roller conveyor 29 having opposed spaced apart sets of rollers. When the arm 23 is in its lowered position it moves downwardly between the opposed sets of rollers of the roller conveyor 29 so as to lay down the slit coil carried thereby upon the rollers of the roller conveyor as illustrated in chain lines in Figure 4.

Next to the roller conveyor 29 is disposed an elevator designated generally by reference numeral 30. The elevator comprises a vertically oriented cylinder 31 in which operates a plunger 32 carrying at its upper end a table 33 carrying coil supporting rollers 34. The plunger 32 is fluid operated in the cylinder 31. When it is in its lowermost position the table 33 is in horizontal alignment with the roller conveyor 29. At that time a coil which has been laid down on the conveyor 29 by the down-ender may be moved to the right viewing Figures 1 and 2 onto the table 33 where it is supported by the rollers 34. The elevator may then be operated to raise the table 33 to the position shown in chain lines in Figure 2 where it is in horizontal alignment with a banding table 35 having coil supporting rollers 36. The coil may be moved from the table 33 to the banding table 35 where it may be banded, whereafter it may be moved to the right viewing Figures 1 and 2 onto a conveyor 37 which may deliver it to a loading station or to storage facilities.

Figure 3 shows a modified form of structure of the elevator table for use primarily with heavy coils. In Figure 3 the elevator is designated generally by reference numeral 30', the cylinder thereof by reference numeral 31', the plunger thereof by reference numeral 32', the coil supporting table thereof by reference numeral 33' and the coil carrying rollers by reference numeral 34'. In the structure of Figure 3 the table 33' is not mounted directly on the plunger 32' but is pivoted at 38 to a head 39 carried by the plunger 32' at its top. A heavy compression coil spring or springs 40 resiliently presses the right-hand portion of the table 33' upwardly viewing Figure 3. Connected with the table 33' and projecting downwardly therefrom is a rod 41 which passes through an opening in the head 39 and carries therebelow a nut 42 and a lock nut 43. The rod 41 thus limits upward movement of the right-hand portion of the table 33' under action of the spring means 40. The spring means 40 is strong enough to maintain the table 33' in horizontal position, the table being held in that position by the rod 41, even when carrying a heavy coil.

The table 33' carries a detent 44 adapted as the elevator reaches the top of its stroke to engage beneath the banding table 35 so that the elevator table 33' will be tilted as shown in chain lines in Figure 3 to facilitate delivery of the coil from the table 33' to the banding table 35. The coil may itself begin to move to the right viewing Figure 3 upon tilting of the table 33' or it may require a push, but in view of the tilting of the table 33' the coil may more easily be moved off of that table than if the table remained horizontal.

Figure 2:
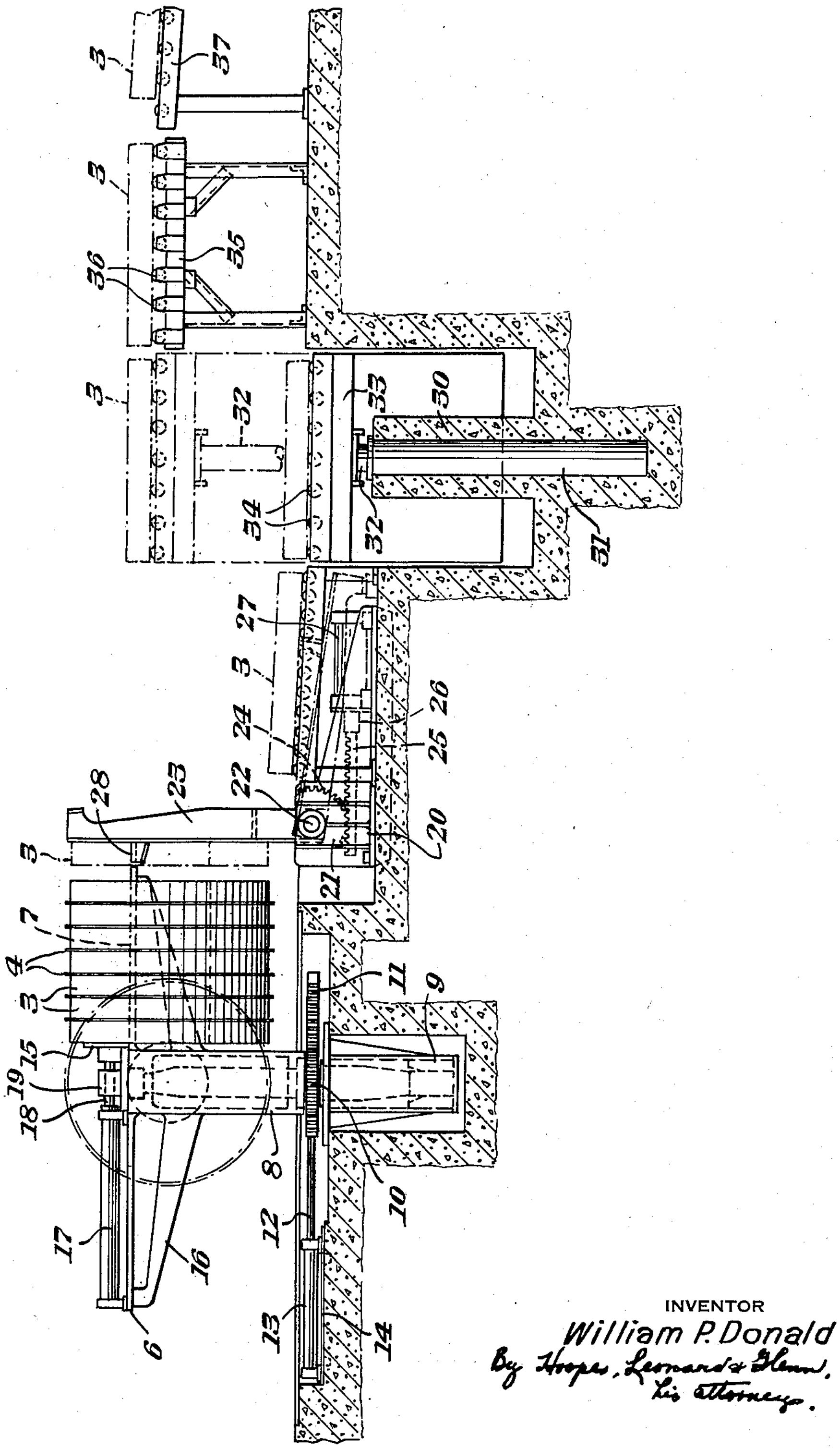
Figure 2 is an elevational view of the apparatus shown in Figure 1 but with the means receiving the coils from the slitter take-up reel in a different operative position.

I shall now describe the present preferred practice of my improved method of handling slit coils employing the apparatus above described. At the completion of the slitting operation the slit coils 3 are disposed in side-by-side coaxial relationship on the slitter take-up reel 2 with their common axis substantially horizontal. Immediately upon completion of the slitting step the mandrel 7 is disposed in alignment with the take-up reel 2 and the pusher 5 is operated to push the group of coils 3 in a single continuous movement off of the reel 2 and onto the mandrel 7. Thus the take-up reel 2 of the slitter is virtually instantaneously freed for use in a succeeding slitting operation. The piston in the cylinder 13 is operated to swing the unloader to the position in which the mandrel 7 is disposed at approximately right angles to the axis of the take-up reel 2 and in alignment with the down-ender. The down-ender arm 23 is raised to its upright position as shown in solid lines in Figure 4 with the saddle 28 disposed directly opposite the end of the mandrel 7. The pusher 15 is operated just far enough to push the end coil 3 off of the mandrel 7 onto the down-ender arm 23, the coil being supported by the saddle 28. The down-ender arm is then moved down to the chain line position of Figure 4, depositing the first slit coil 3 upon the roller table 29. The coil is moved to the right viewing Figures 1 and 2 from the table 29 onto the elevator table. The table 29 may be slightly inclined to facilitate this movement as shown in Figures 2 and 4. As soon as the coil clears the end of the down-ender arm 23 that arm is moved up to vertical position to receive the next slit coil. The separator disc 4 is removed from each coil as it is laid down by the down-ender.

Each coil as it is delivered to the elevator table is raised to the elevation of the banding table 35 where it is moved toward the right viewing Figures 1, 2 and 3 onto the banding table where it is banded and delivered on the conveyor 37. The operation of the modified form of elevator as shown in Figure 3 has been described above.

Thus the slit coils are handled separately from the mandrel 7, the operation being rapid and efficient and resulting in sequential movement of the coils to the elevator, the banding table and the delivery conveyor in rapid succession so that the mandrel 7 has been cleared and is ready for receiving the next group of slit coils by the time the succeeding slitting operation has been completed. Each time one of the slit coils is pushed off of the mandrel 7 the pusher 15 is advanced only a distance equal to the thickness of a coil plus the thickness of one of the discs 4, the remaining slit coils remaining on the mandrel.

I thus accomplish very rapid and efficient handling of slit coils insuring a minimum of time during which the slitter is not in operation and also insuring a minimum of labor and manual handling of the coils. The only manual work which has to be done on the coils is to insure their movement along the conveyors and apply the bands.

While I have shown and described certain present preferred embodiments of the invention and have illustrated certain present preferred methods of practicing the same, it is to be distinctly understood that the invention is not limited thereto but may be otherwise variously embodied and practiced within the scope of the following claims.

I claim:

1. Apparatus for handling slit coils comprising means for receiving a group of coaxial slit coils as a unit with their common axis extending generally horizontally, means for delivering the coils one by one from the first mentioned means, means receiving each such delivered coil, said last mentioned means having a projection entering and supporting internally the delivered coils and being shiftable to lay down upon shifting thereof the coils received thereby, and means for sequentially advancing the thus laid down coils.

2. Apparatus for handling slit coils comprising means for receiving a group of coaxial slit coils as a unit with their common axis extending generally horizontally, means for delivering the coils one by one from the first mentioned means, means mounted for generally rectilinear movement at substantially right angles to the horizontal for elevating sequentially in a vertical direction the thus delivered coils, and means to which the elevated coils are delivered, the elevating means having means operable to initiate transverse movement of each elevated coil to said last mentioned means.

3. Apparatus for handling slit coils comprising means for receiving a group of coaxial slit coils as a unit with their common axis generally horizontal, a coil carrier turnable in a generally vertical plane between a generally upright and a generally horizontal position adapted to carry the coils one by one from the first mentioned means to a position in which the coil axis is generally vertical and to dispose each coil upon a roller table, the coil carrier having a projection entering the coils and supporting them internally, a roller table receiving the coils so disposed, a second roller table disposable adjacent the first mentioned roller table to receive the coils from the first mentioned roller table and means to elevate the second roller table to deliver the coils to an operating station at a level higher than the level of the first mentioned roller table.

4. A method of handling unbanded coils originally disposed in a group in side-by-side relationship on a support with the axes of the coils generally horizontal, comprising sequentially separating individual coils from the group by pushing the same in a direction generally parallel to the axes of the coils to remove them sequentially from the support into position with a side face of each coil against a wall and supporting the coil internally in such position so as to maintain the coil with its axis generally horizontal and sequentially moving the thus separated coils along a predetermined path through a banding station and sequentially banding the coils, each when it is disposed at the banding station.

5. A method of handling unbanded coils originally disposed in a group in side-by-side relationship on a support with the axes of the coils generally horizontal, comprising sequentially separating individual coils from the group by pushing the same in a direction generally parallel to the axes of the coils to remove them sequentially from the support into position with a side face of each coil against a wall and supporting the coil internally in such position as to maintain the coil with its axis generally horizontal, sequentially turning the thus separated coils into positions with their axes generally upright, while positioned with their axes generally upright advancing the coils to a banding station and banding the coils with their axes generally upright.

6. Apparatus for handling unbanded coils originally disposed in a group in side-by-side relationship on a support with the axes of the coils generally horizontal, comprising a receiving station for receiving a coil of the group of coils, means for pushing the coils generally axially of the coils to remove them one by one from the support to sequentially separate individual coils from the group and dispose each such separated coil at the receiving station, said means being disposed at the end of the group of coils axially opposite the receiving station, the receiving station having a generally upright wall against which each such separated coil is adapted to lie as the coil is delivered from the support to maintain the coil with its axis generally horizontal and a projection extending outwardly from the wall at the upper portion of the wall entering and supporting internally the delivered coils, and means for moving the wall to sequentially lay down the coils to position them with their axes generally upright.

7. Apparatus for handling unbanded coils originally disposed in a group in side-by-side relationship on a support with the axes of the coils generally horizontal, comprising a receiving station for receiving a coil of the group of coils, means for pushing the coils generally axially of the coils to remove them one by one from the support to sequentially separate individual coils from the group and dispose each such separated coil at the receiving station, said means being disposed at the end of the group of coils axially opposite the receiving station, the receiving station having a generally upright wall against which each such separated coil is adapted to lie as the coil is delivered from the support to maintain the coil with its axis generally horizontal, a banding station at an elevation above the bottom of the receiving station, a roller table, means including the wall for sequentially laying down on the roller table the coils from the receiving station and an elevator receiving the coils from the roller table and elevating them to the banding station, the banding station having another roller table on which the coils lie while being banded.

8. Apparatus for handling unbanded coils originally disposed in a group in side-by-side relationship on a support with the axes of the coils generally horizontal, comprising a receiving station for receiving a coil of the group of coils, means for pushing the coils generally axially of the coils to remove them one by one from the support to sequentially separate individual coils from the group and dispose each such separated coil at the receiving station, said means being disposed at the end of the group of coils axially opposite the receiving station, the receiving station having a generally upright wall against which each such separated coil is adapted to lie as the coil is delivered from the support to maintain the coil with its axis generally horizontal and a saddle entering and supporting internally the delivered coils, and a pivotal mounting for the wall whereby it may be turned from generally upright position to generally horizontal position to sequentially lay down the coils disposed at the receiving station.

References Cited in the file of this patent

UNITED STATES PATENTS

| | | |
|---|---|---|
| 871,120 | Holmes | Nov. 19, 1907 |
| 1,066,113 | Hulett | July 1, 1913 |
| 1,261,589 | Mogan et al. | Apr. 2, 1918 |
| 1,779,381 | Johnson | Oct. 21, 1930 |
| 2,092,540 | Talbot | Sept. 7, 1937 |
| 2,101,738 | Gotthard | Dec. 7, 1937 |
| 2,156,695 | Klein | May 2, 1939 |
| 2,327,906 | Kiefer | Aug. 24, 1943 |
| 2,401,592 | VonStocker | June 4, 1946 |
| 2,430,075 | Olson | Nov. 4, 1947 |